April 25, 1961

M. LEVECQUE ET AL 2,980,954

APPARATUS FOR PRODUCING FIBERS FROM
THERMOPLASTIC MATERIAL

Filed Feb. 21, 1956

INVENTORS
MARCEL LEVECQUE
& PAUL PIOT

BY

ATTORNEY

April 25, 1961

M. LEVECQUE ET AL 2,980,954

APPARATUS FOR PRODUCING FIBERS FROM
THERMOPLASTIC MATERIAL

Filed Feb. 21, 1956

INVENTORS
MARCEL LEVECQUE
& PAUL PIOT
BY

ATTORNEY

United States Patent Office 2,980,954
Patented Apr. 25, 1961

2,980,954
APPARATUS FOR PRODUCING FIBERS FROM THERMOPLASTIC MATERIAL

Marcel Levecque, Saint-Gratien, and Paul Piot, Deuil, France, assignors to Societe Anonyme des Manufactures des Glaces & Produits Chimiques de Saint-Gobain, Chauny & Cirey, Paris, France, a corporation of France Filed Feb. 21, 1956, Ser. No. 567,024

Claims priority, application France Feb. 28, 1955

7 Claims. (Cl. 18—2.6)

The present invention relates to the manufacture of fibers from mineral or organic materials in the viscous state, and more particularly of glass fibers. More specifically it relates to a method and apparatus in which molten material is supplied into the interior of a centrifugal body rotating at high speed and projected under the action of centrifugal force through a plurality of orifices provided in the peripheral wall of said centrifugal body.

Applicants have found that, to put such a method into practice, particularly to obtain fibers of uniform diameter, the feeding of all the holes or orifices in the peripheral wall of the centrifugal body must be as uniform as possible and the instantaneous discharge from each orifice be also as constant as possible. Such an even feeding presents no difficulty when the projection is made through orifices arranged in a single row in the periphery of a centrifugal body. On the other hand, when, to increase efficiency and production, it is attempted to use a centrifugal body with several rows of superposed orifices on its periphery, the filaments produced by the emission of the material through the orifices of the several rows assume different values due to the different conditions which exist behind the different projection orifices, for example, in thickness of the layer of the material and in temperature and this is so much greater as this layer behind the orifices increases in height. If the feed of material becomes irregular, the fibers may have an uneven diameter or even issue from the centrifugal body in drops as a result of local overpressure opposite certain orifices or shock effect at contact with some regions of the peripheral wall of the centrifugal body.

An object of the present invention is the provision of a method and apparatus to overcome and eliminate the above deficiencies.

It consists in providing a distributor element on the inside of the centrifugal body which receives the supply stream of molten material, this element projecting the material under the action of the centrifugal force and distributing it evenly over the entire inner surface of the peripheral wall of the centrifugal body and the orifices therein in such a way as to produce thereon a layer of uniform or substantially uniform thickness with the result that all the orifices are fed in identical fashion. Thus the invention makes it possible to produce a very homogeneous and even feed of all orifices of the centrifugal body even when these orifices are distributed in a large number of rows over a cylindrical centrifugal body.

According to one form of the invention, the distributor element, mounted on the base of the centrifugal body and along the axis of the latter, has a conical shape facing upward. The direction of the supply stream of molten material changing from time to time and swaying laterally out of the true vertical, either freely because of its viscosity and undersupport or under convenient control, flows onto the cone at points more or less closer to the axis thereof whereupon the material is projected by the distributor to the different levels with the result that the entire inside surface of the peripheral wall of the centrifugal body and its orifices is initially covered by such projection.

The distributor element may also incorporate a certain number of sloping or horizotal working surfaces or points on which the supply material is deposited in consequence of continual variations of the point of contact of the material with the surface of the distributor.

The surface of the distributor can be smooth or it can contain projections or recesses constituting starting points from which the molten material is projected.

The upper surface of the distributor may carry radial grooves or channels which by retarding the propagation of the material toward the periphery of the distributor element, makes for a good spreading out over the periphery of the distributor and, in consequence aids to render uniform the distribution of the material on the inner surface of the peripheral wall of the centrifugal body.

According to the forms mentioned above, the distributor can be advantageously made of a metallic alloy presenting a good wettability by the molten material, which aids in reducing the formation of droplets. The invention comprehends for this use a nickel-chrome-steel alloy of about 18% nickel and 24-26% chromium, and as much as possible free of silicon.

The distributor can also take the form of a hollow body or receptacle, placed inside the centrifugal body and carrying in its peripheral wall one or more rows of projection orifices through which the material is projected in a finely divided state for feeding the orifices of the centrifugal body. This receptacle rotates with the centrifugal body and is fed by the supply stream of molten material. This form of the invention makes it possible to give the receptacle or distributor an important regulator function for obtaining an even feed to the inner surface of the peripheral wall of the centrifugal body and the projection orifices. In fact, it is possible by projecting a very thin and constantly renewed homogenous film or layer of molten material over the inside of this wall to produce a reserve of molten material. The material is projected through the orifices of the distributor or receptacle in the form of very fine filaments which begin to form behind the orifices, the thin film is then built up or applied over the entire inside peripheral area of the centrifugal body and the orifices without producing an injurious shock effect. The molten material is projected from the orifices of the hollow distributor body in the state of filaments at a rate of rotation equal to that of the system. To obtain the best advantages, it is necessary that all orifices of the receptacle discharge the molten material, which assumes the preservation of a minimum amount of molten material in this element, the maximum amount being limited only by the outflow from this element. Several hollow distributors or receptacles of different diameter can be combined and placed within the centrifugal body.

Reference will now be had to the accompanying drawings in which.

Figure 2:
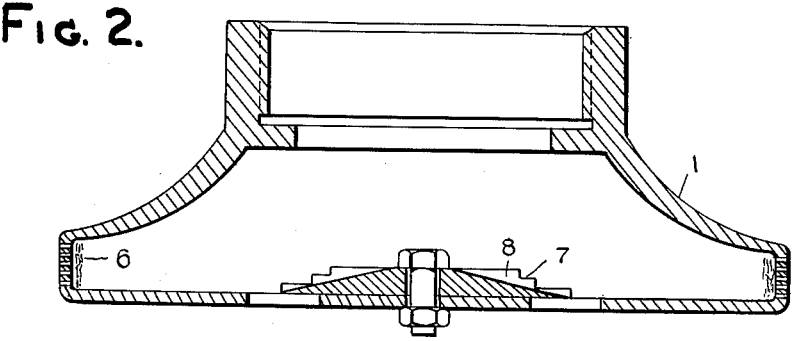
Fig. 2 is a similar view of a modified form.
Figure 3:
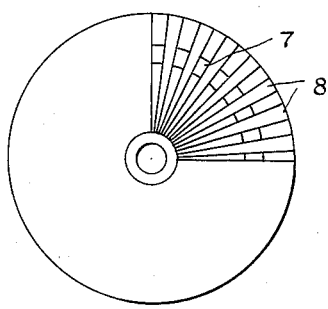

Fig. 3 a partial plan view of the distributor of Fig. 2.

Figure 4:
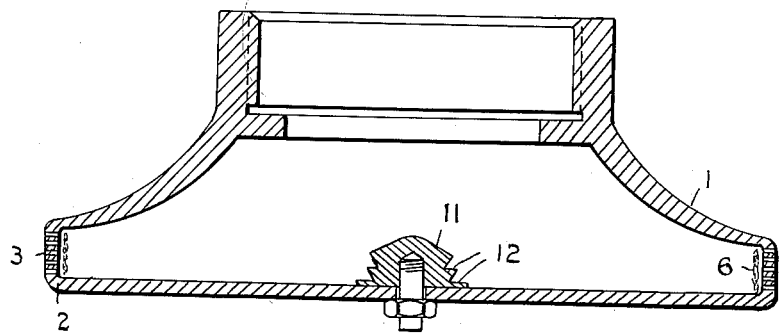

Fig. 4 a vertical section showing another form of distributor.

Figure 5:
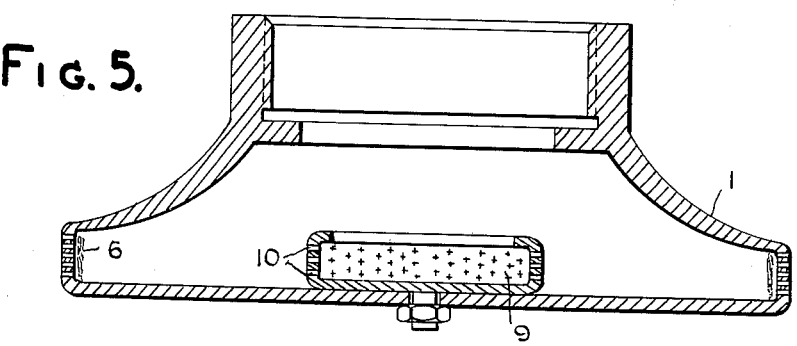

Fig. 5 shows a distributor in the form of a hollow body or receptacle.

Figure 6:
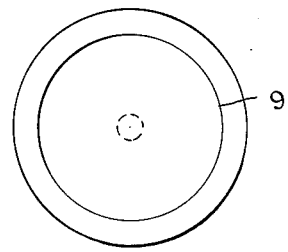

Fig. 6 is a plan view of the distributor of Fig. 5.

In the represented forms the centrifugal body 1 has a cylindrical peripheral wall 2 in which are provided a plurality of rows of projection orifices 3. It is advantageous to arrange the holes of the various rows according to regular quincunxes. The body 1 will be rotated at sufficient speed by any well known means, not shown.

Figure 1:
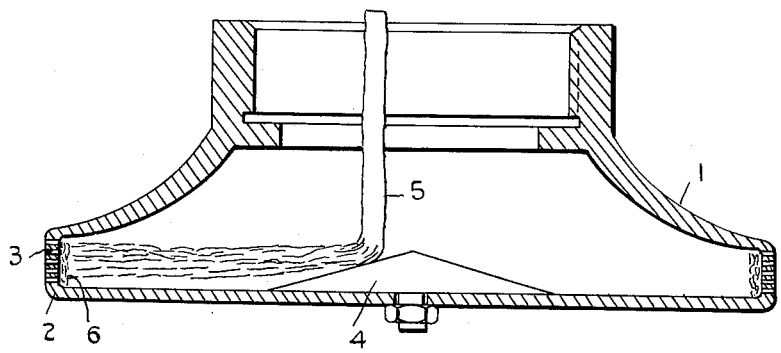
Fig. 1 is a vertical section of one form of the invention.

In the form of Fig. 1 the distributor 4 on the centrifugal body 1 is cone-shaped, the axis coinciding with that of the rotating body. Owing to its mobility, the supply streams 5 of molten material drops or feeds downwardly onto cone 4 at varying points as above described. The material which is then projected by cone 4 from the different points of receipt under the effect of the centrifugal force strikes the inner surface of the centrifugal wall 2 at different and variable levels, thus producing on the wall a thin layer or film 6 of practically constant thickness over the entire height of the said walls.

In the form shown in Fig. 2, the distributor forms three bearings 7 in the form of disks of decreasing diameter from base to top and shown in Fig. 3, this distributor can be divided by means of radial grooves 8.

In the form shown in Fig. 4, the distributor 11, in form of a mushroom, has circular grooves 12, of increasing diameter from top to bottom. These steps form successive bearings acting to project the molten material.

Fig. 5 shows the form wherein the distributor is formed as a hollow body, or receptacle 9, into which the filament of molten material feeds. This receptacle is provided with a plurality of rows of orifices 10 in its peripheral wall. The molten material is projected through the orifices 10 over the entire height of the inner surface of the peripheral wall 2 in a uniform and regular manner, prodcing a fine film or layer 6 of sensibly constant thickness. The orifices in the hollow body 9 may be holes of the order of 2 mms. or smaller diameter or slots of any given position.

What is claimed is:

1. In apparatus for manufacturing glass fibers from molten vitreous material, the combination of an annular body having a peripheral wall of substantial height provided with a plurality of rows of orifices therein for the discharge of molten material under the action of centrifugal force upon the rotation of said body at sufficient speed, a rotary distributor within said annular body having a substantial height of the order of that of the peripheral wall, with the discharge areas of said distributor being spaced a substantial distance from said peripheral wall and being disposed substantially at an intermediate level of said superposed rows of orifices therein, to receive a supply stream of molten material from above and project successive portions of said stream outwardly toward and into contact with the entire inner peripheral surface of the centrifugal body and which strikes substantially simultaneously and uniformly the plurality of rows of orifices therein, said discharge areas of said distributor having a surface component on its exterior surface parallel to the rotary axis thereof to initiate the last-mentioned projected portions of said stream from a band of substantial height, and means for rotating said annular body at a speed sufficient to discharge fibers from the rows of orifices therein.

2. In an apparatus for manufacturing glass fibers from molten vitreous material, the combination of an annular body having a peripheral wall of substantial height provided with a plurality of rows of orifices therein for the discharge of the molten material under the action of centrifugal force upon the rotation of said body at sufficient speed, a rotary distributor within said annular body having a substantially conical shape provided with an upwardly extending surface spaced a substantial distance from said peripheral wall to receive a supply stream of molten material from above, wherein the direction of the supply stream of molten material changes from time to time by swaying laterally out of the true vertical so that said stream is received at different levels along said conical surface, to project portions of said stream outwardly from different levels and thereby to distribute said material onto the whole height of the peripheral band of the centrifuging body, the material projected from the different levels striking simultaneously and uniformly the peripheral band of the centrifuge so as to form on the whole height of said band bearing the rows of orifices a homogeneous film of substantially uniform thickness, and means for rotating said annular body at a speed sufficient to discharge fibers from the rows of orifices therein.

3. The apparatus set forth in claim 2 wherein the conical surface of the distributor is provided with a plurality of superposed disc-like portions of different diameters.

4. The apparatus set forth in claim 2 wherein the conical surface of the distributor is provided with recesses extending radially outwardly.

5. The apparatus set forth in claim 2 wherein the conical surface of the distributor is provided with annular grooves of different diameters.

6. The apparatus set forth in claim 2 wherein the conical surface of the distributor contains projections or recesses constituting starting points from which the molten material is projected.

7. In an apparatus for manufacturing glass fibers from molten vitreous material, the combination of an annular body having a peripheral wall of substantial height provided with a plurality of rows of orifices therein for the discharge of molten material under the action of centrifugal force upon the rotation of said body at sufficient speed, a rotary receptacle within said body, spaced a substantial distance from said peripheral wall and having a peripheral wall provided with a plurality of rows of orifices positioned to receive a supply stream of molten material from above and projecting said material from the different levels of the different rows of orifices so as to project from each of said levels portions of said stream outwardly, the material projected from the different levels striking simultaneously and uniformly the peripheral band of the centrifuge so as to form on the whole height of said band bearing the rows of orifices a homogeneous film of substantially uniform thickness, and means for rotating said annular body at a speed sufficient to discharge fibers from the rows of orifices therein.

References Cited in the file of this patent

UNITED STATES PATENTS

| | | |
|---|---|---|
| 2,431,205 | Slayter | Nov. 18, 1947 |
| 2,624,912 | Heymes et al. | Jan. 13, 1953 |
| 2,816,826 | Brennan | Dec. 17, 1957 |